(12) United States Patent
Chatelain et al.

(10) Patent No.: US 11,379,537 B2
(45) Date of Patent: Jul. 5, 2022

(54) CLOSED-LOOP UNIFIED METADATA ARCHITECTURE WITH UNIVERSAL METADATA REPOSITORY

(71) Applicant: Accenture Global Solutions Limited, Dublin (IE)

(72) Inventors: Jean-Luc Chatelain, Atlanta, GA (US); Teresa Sheausan Tung, San Jose, CA (US); Sonali Parthasarathy, Mountain View, CA (US); Colin Anil Puri, San Jose, CA (US); Amirreza Abdolrashidi, San Jose, CA (US); Neda Abolhassani, Athens, GA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 308 days.

(21) Appl. No.: 15/801,787

(22) Filed: Nov. 2, 2017

(65) Prior Publication Data
US 2018/0144067 A1    May 24, 2018

Related U.S. Application Data

(60) Provisional application No. 62/424,199, filed on Nov. 18, 2016.

(51) Int. Cl.
*G06F 16/00*   (2019.01)
*G06F 7/00*   (2006.01)
(Continued)

(52) U.S. Cl.
CPC .............. *G06F 16/907* (2019.01); *G06F 7/02* (2013.01); *G06F 16/164* (2019.01); *G06F 16/24573* (2019.01); *G06F 16/9038* (2019.01)

(58) Field of Classification Search
CPC .......... G06F 16/13; G06F 16/22; G06F 16/31; G06F 16/35; G06F 16/51; G06F 16/61; G06F 16/958; G06F 16/907; G06F 16/24573; G06F 16/164; G06F 16/9038; G06F 7/02
(Continued)

(56) References Cited

U.S. PATENT DOCUMENTS 8,417,715 B1 * 4/2013 Bruckhaus ......... G06Q 30/0202
                                                    707/758
9,384,231 B2    7/2016 Benjamin
(Continued)

OTHER PUBLICATIONS

Australian Examination Report No. 1, dated Mar. 9, 2018, pp. 1-9, issued in Australian Patent Application No. 2017258966, Offices of IP Australia, Woden ACT, Australia.
(Continued)

*Primary Examiner* — Raquel Perez-Arroyo
(74) *Attorney, Agent, or Firm* — Crowell & Moring LLP

(57) ABSTRACT

There has been exponential growth in the capture and retention of immense quantities of information in a globally distributed manner. A closed-loop unified metadata architecture includes a universal metadata repository and implements data quality and data lineage analyses. The architecture solves significant technical challenges to provide a meaningful, consistent and normalized view of the metadata that describes the information, as well as to determine data lineage and meaningful data quality metrics.

20 Claims, 12 Drawing Sheets

(51) Int. Cl.
  *G06F 16/907* (2019.01)
  *G06F 16/9038* (2019.01)
  *G06F 16/2457* (2019.01)
  *G06F 16/16* (2019.01)
  *G06F 7/02* (2006.01)
(58) Field of Classification Search
  USPC .......................................................... 707/736
  See application file for complete search history.

(56) References Cited

U.S. PATENT DOCUMENTS

| | | | | |
|---|---|---|---|---|
| 2007/0255741 | A1* | 11/2007 | Geiger | G06F 16/24573 |
| 2010/0138431 | A1* | 6/2010 | Bator | G06F 16/40 707/755 |
| 2011/0231454 | A1 | 9/2011 | Mack | |
| 2013/0246345 | A1 | 9/2013 | Eisler et al. | |
| 2013/0325789 | A1* | 12/2013 | Krishnan | G06F 16/254 707/602 |
| 2013/0332423 | A1 | 12/2013 | Puri et al. | |
| 2014/0310623 | A1* | 10/2014 | O'Connell, Jr. | G06F 16/958 715/764 |
| 2014/0379665 | A1* | 12/2014 | Benjamin | G06Q 40/00 707/687 |
| 2016/0162533 | A1* | 6/2016 | Wilson | G06Q 10/00 707/602 |
| 2016/0253340 | A1* | 9/2016 | Barth | G06F 16/122 707/756 |

OTHER PUBLICATIONS

Marco, D., "Advanced Metadata Architecture," dated Jul. 1, 2000, pp. 1-4, The Data Administration Newsletter, TDAN.com, retrieved from the Internet Mar. 20, 2018 at URL: http://tdan.com/advanced-metadata-architecture/4870.

Australian Examination Report No. 2, dated Sep. 27, 2018, pp. 1-8, issued in Australia Patent Application No. 2017258966, Offices of IP Australia, Woden, ACT, Australia.

Extended European Search Report, dated Feb. 7, 2018, pp. 1-7, issued in European Patent Application No. 17201643.8, European Patent Office, Munich, Germany.

Gil, Yolanda, et al., "Workflow Matching Using Sematic Metadata," dated Sep. 1, 2009, pp. 121-128, Proceedings of the Fifth International Conference on Knowledge Capture, K-Cap '09, ACM Press, New York, New York, USA, XP058361444.

Australian Examination Report No. 3, dated Feb. 21, 2019, pp. 1-8, issued in Australia Patent Application No. 2017258966, Offices of IP Australia, Woden, ACT, Australia.

Metadata repository, [online article], [retrieved from the Internet on Feb. 12, 2019], <URL: https://web.archive.org/web/20150325231730/ http://en.wikipedia.org/wiki/Metadata repository> published on Mar. 25, 2015 as per Wayback Machine.

Puri, C., "Chicken Wings & Data Lineage, Who Knew. . . ", published on Aug. 20, 2012, [online article], [retrieved from the Internet on Feb. 12, 2019], <URL: https://www.accenture.com/us-en/blogs/blogs-chicken-wings-amp-data-lineage-who-knew>.

Australian Examination Report No. 1, dated Feb. 27, 2020, pp. 1-5, issued in Australian Patent Application No. 2019201496, Offices of IP Australia, Woden, ACT, Australia.

European Office Action, dated Feb. 12, 2021, pp. 1-5, issued in European Patent Application No. 17201643.8, European Patent Office, Berlin, Germany.

Australian Examination Report No. 2 dated Feb. 10, 2021, pp. 1-3, issued in Australian patent application No. 2019201496, Offices of IP Australia, Woden, NCT, Australia.

India Office Action, dated Aug. 25, 2020, pp. 1-7, issued in India Patent Application No. 201744040622, Intellectual Property India, Guindy, Cheenai, India.

Office Action issued on corresponding Chinese application 2021041502470580 dated Apr. 20, 2021, 12 pages.

* cited by examiner

US 11,379,537 B2

CLOSED-LOOP UNIFIED METADATA ARCHITECTURE WITH UNIVERSAL METADATA REPOSITORY

CROSS REFERENCE TO RELATED APPLICATIONS

The present application is entitled to a right of priority pursuant to 35 U.S.C. § 119 from U.S. Provisional Patent Application No. 62/424,199 filed Nov. 18, 2016, which is herein entirely incorporated by reference.

TECHNICAL FIELD

This disclosure relates to complex processing of metadata from diverse data sources to provide a unified metadata view, and to use the metadata to drive data analytics, including data quality and data lineage analyses.

BACKGROUND

The processing power, network bandwidth, available storage space, and other resources available to computing systems have increased exponentially in recent decades. Advances in computing systems, both local and cloud-based, have led to the capture, storage, and retention of immense quantities of information content in a globally distributed manner. It is a significant technical challenge to obtain a meaningful, consistent and normalized view of the metadata that describes the information content, as well as to perform meaningful analytics on the information content.

DETAILED DESCRIPTION

A closed-loop universal metadata architecture ("architecture") implements a universal metadata repository ("UMR") and performs data analytics, including determining and maintaining data lineage, and determining meaningful data quality metrics. The architecture automatically scans and captures metadata characterizing input data driven into any pre-defined enterprise workflows from any number and type of data sources, whether internal to an enterprise or external to the enterprise that hosts the workflows. The architecture may be programmatically used for data tracking, management, review, reporting and many other purposes.

The UMR is universal in the sense that it provides a single logical user interface view of input data to the workflows, including business and technical data in the form of, for example, a graph schema. The programmatic capabilities of the architecture implement flexible data lineage tracking, data quality determination, data gap filling, and discovery of additional data via, e.g., similarity detection. The UMR integrates any desired data profiles and similarity profiles across an entire enterprise platform. The architecture includes a feedback loop that, e.g., enforces business rules, re-scans the data sources, and updates the UMR on any scheduled or directed basis.

Figure 1:
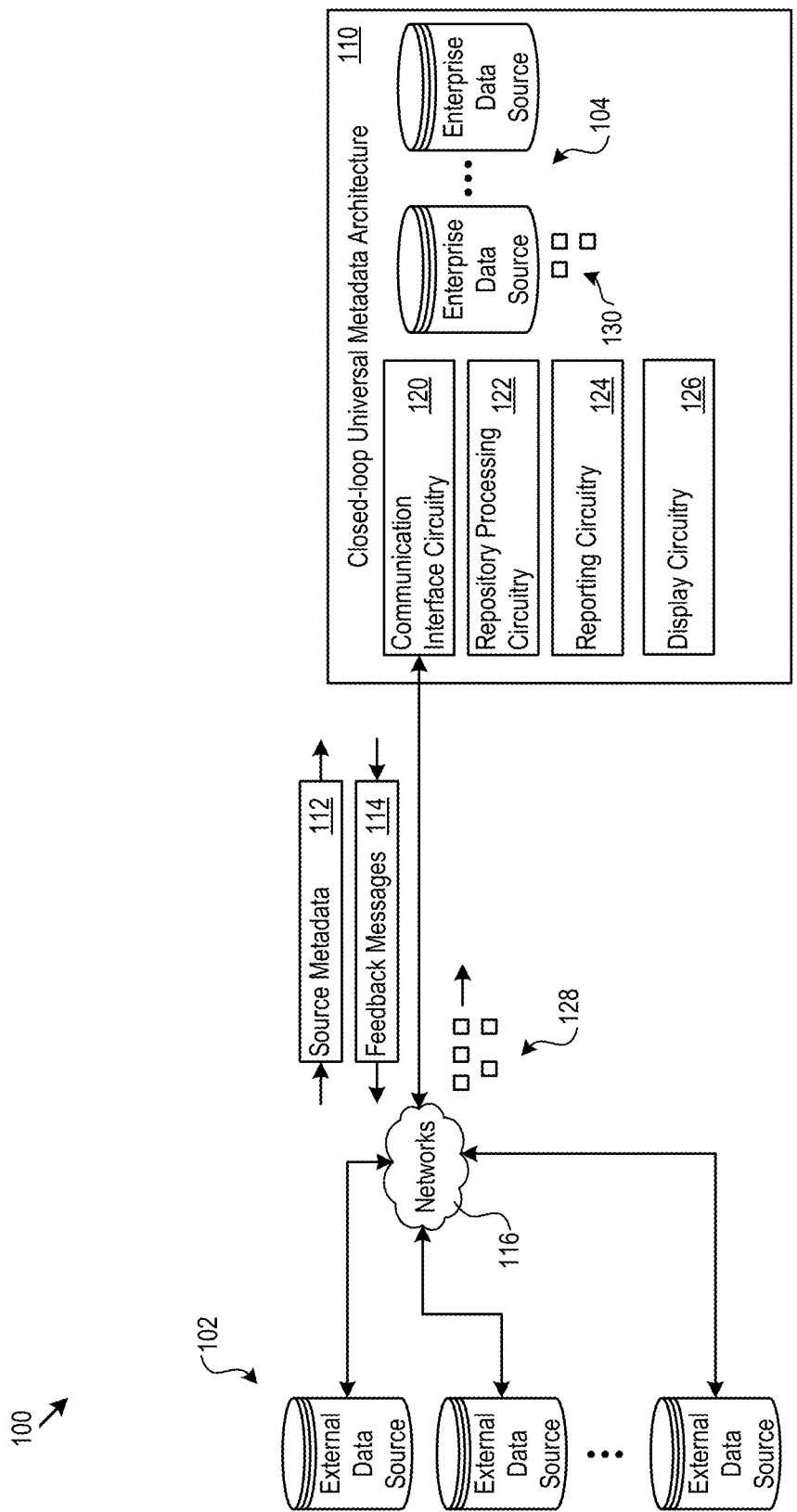
FIG. 1 shows a closed-loop universal metadata architecture that implements a universal metadata repository.
Figure 2:
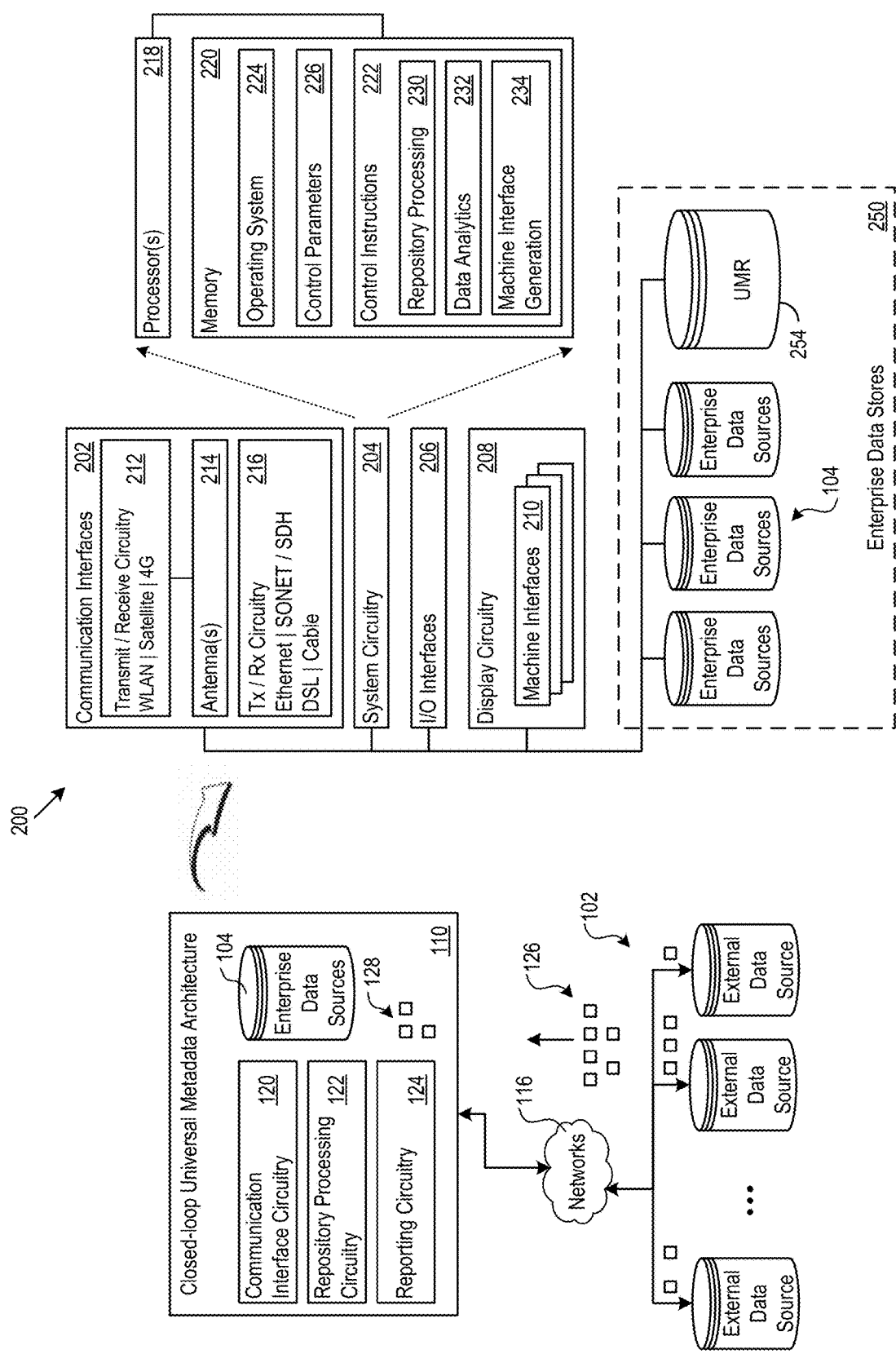
FIG. 2 shows another example implementation of the architecture.

FIGS. 1 and 2 provide an example context for the discussion below of the technical solutions in the architecture, including the UMR, data quality metrics, data lineage and reporting. The examples in FIGS. 1 and 2 show possible implementations. In that respect, the technical solutions in the architecture are not limited in their application or implementation to the systems shown in FIGS. 1 and 2, or any of the other Figures. Instead, the technical solutions may be implemented via many other system implementations, architectures, and connectivities. For example, additional hardware and software implementations of the architecture, additional logic flows implemented in the architecture, and additional GUI interfaces defined and delivered by the architecture are described herein.

FIG. 1 shows network connected entities 100, including the architecture 110, and (with respect to the architecture 110) both internal data sources 102 and external data sources 104. The architecture 110 receives source metadata, e.g., the source metadata 112, from the data sources, and returns feedback messages, e.g., the feedback message 114, to the data sources via any number or type of public and private communication networks, e.g., the communication network 116.

As described herein, the architecture 110 receives the source metadata, and on behalf of any given enterprise running any pre-defined workflows, analyzes and processes the source metadata, builds and maintains a UMR, determines data quality metrics, scores data quality metrics, builds and maintains data lineage, performs data lineage scoring, sends feedback to the data sources and provides a holistic view of the UMR in a graphical user interface (GUI). To that end, the architecture 110 includes communication interface circuitry 120 that is connect to the data sources 102 and 104, as well as repository processing circuitry 122, reporting circuitry 124, and display circuitry 126. The architecture 110 performs its analysis of input data directed into pre-defined workflow on the basis of metadata elements, e.g., the metadata elements 128 and 130, received from any data source.

With regard to the obtaining the source metadata, the architecture 110 may facilitate metadata collection by implementing a vendor agnostic communication layer, with an exposed application programming interface (API) for import and export of data. The architecture 110 includes a repository of enrichment algorithms, including data quality and data lineage generation and analysis to enrich the metadata beyond what is available via vendor tools. Moreover, a computer based feedback loop may be present as part of the enrichment algorithms to automatically and dynamically obtain additional metadata from the data sources as deficiencies in the metadata are identified by the architecture 110.

Expressed another way, the communication interface circuitry 120 retrieves source metadata from data sources 102. The data sources 102 provide input data in various schemas to pre-defined workflows for any given enterprise, and the source metadata characterizes that input data to create a uniform schema in a universal metadata repository. The communication interface circuitry 120 provides the source metadata to the repository processing circuitry 122. In turn, the repository processing circuitry 122 integrates the source metadata into the schema of the universal metadata repository. As part of the source metadata integration process, the repository processing circuitry 122 may identify key data frames within the source metadata from each data source 102. The key data frames may be stored in the universal metadata repository to be representative of the entirety of the extracted source metadata. The repository processing circuitry 122 may also perform data analytics on the input data represented in the universal metadata repository, and execute a feedback loop responsive to the data analytics to deliver the feedback messages 114 to the data sources 102 to update and/or enrich the metadata present in the universal metadata repository.

The architecture 110 may perform a wide variety of data analytics, including static data analysis and dynamic data analysis. Static data analysis may include computer based review and analysis of the normalized metadata information ingested from the data sources. For example, static data analysis may include analysis of the a data lineage schema or structure, the data sources from which the metadata is extracted, and/or the collected metadata. In another example, static data analysis may involve comparison of newly obtain metadata with previously obtained metadata for completeness, trends, omissions and significant changes. In still another example, static analysis may be an analysis for gaps or omissions in the normalized metadata obtained from the data sources. The static data analysis may be performed by the computer based on computer based historical data comparison, rules, relationships, predetermined setpoints, predetermined thresholds, and/or any other mechanisms or process to identify shortfalls, omissions, or undesirable variations.

Dynamic data analysis may involve rules based data analysis, generation of data metrics and/or analysis of generated data metrics. As just one example, the architecture 110 may dynamically determine a data quality metric for the input data based on the source metadata. Data quality metrics generated by the architecture 110 may include 1)computer based data quality source completeness analysis, 2)computer based data accuracy analysis, 3)computer based data precision analysis, 4)computer based timeliness analysis, and 5)computer based reasonableness analysis may be performed. In addition, duplication, veracity/integrity, data coverage, data variation, and other parameter analysis may be included in the computer based accuracy analysis.

Such computer based dynamic analysis may be based on predetermined values, predetermined thresholds, comparison with third party information, comparison with collateral information, consideration of service level agreements, historical data comparison or any other analysis capable of identifying possible issues. For example, data accuracy, precision, and veracity/precision analysis may be based on data source analysis, attribute analysis and the like. Timeliness analysis may be involve a time based analysis in which data from a certain time period or time value is compared, contrasted and otherwise analyzed with respect to data from another certain time period or time value. Reasonableness, duplication, data coverage and data variation analysis may be based on historical data analysis, corresponding data analysis, predetermined values or thresholds and other such considerations. Such computer based analysis may be rules based, based on statistical analysis, based on modeling, based on machine learning, based on artificial intelligence (AI), based on third party information, and/or based on any other parameters or conditions. Also, consideration and comparison of technical context and business context information, such as via an incidence graph may also be included as part of the dynamic data analysis.

As a result of the dynamic data analysis, a feedback message 114 may specify a data quality alert responsive to the data quality metric, with the data quality alert responsive to a data quality rule executed on the data quality metric (e.g., 'send an alert when the last data value does not fit the current trend'). In another example, a gap in metadata may be identified and included in a feedback message 114.

The architecture 110 may also provide various reporting using the reporting circuitry 124 based on the data analytics performed. Reporting may be in the form of exportable files, viewable graphs, lists, tables and the like, and/or generation of databases or other data repositories. Reporting may be via the user interface circuitry 126.

The user interface circuitry 126 may include one or more graphical user interfaces, displays, touch sensitive displays, voice or facial recognition inputs, buttons, switches, speakers, printers, and other peripheral elements or devices that allow human sensory perception of system operation. Additional examples include microphones, video and still image cameras, and any other input output devices. The user interface circuitry 126 may include hardware displays such as liquid crystal displays (LCD), Light Emitting Diode (LED) displays or any other form of image rendering hardware. In addition or alternatively, the user interface circuitry 126 may include transmission and/or image rendering hardware to enable image rendering and display on any hardware device or system whether local or remote from the architecture. For example, the user interface circuitry 126 may support web based interaction and display via a browser or other form of communication interface.

The user interface circuitry 126 may also provide sensory perception to a user of operation, functionality and control of the architecture 110. For example, the user interface circuitry 126 may include the capability to provide a holistic view of the extracted source metadata represented in the universal metadata repository on a user interface, such as a display. The holistic view may be provided based on the key data frames. In an example, the holistic view may be depicted in an incidence schema or graph user interface view depicting relational aspects of the metadata represented in the universal metadata repository in a technical context. In addition, a business context may be extrapolated from the technical context. For example, the incidence schema view may illustrate relation of the key data frames to the data sources and to various attributes of the key data frames. In addition, relationships and context such as reference, relatedness, inheritance and hierarchy may be identified between data sources, technical context of the metadata, and business focus of a particular business or industry. For example, in an incidence graph user interface, attributes of the key data frames in the technical context may be depicted in a relationship, and/or in context to, nodes in a business context that is specific to a particular business or industry segment. The technical context may also be used in relationships to more than one business or industry by re-focusing extrapolation of the technical context into additional business context scenarios.

As another example, the static data analytics may include creating or updating a data lineage structure for the input data. The data lineage structure captures the lifecycle of input data and its consumption, which may be implemented and described in many different ways. In one respect the data lineage structure provides an incidence schema, incidence graph, or line of descent map, of the input data. The incidence graph may include lineage data fields that specify any combination of the following, as just a few examples: who affected the input data, what affected the input data, where the input data was affected, when the input data was affected, why the input data was affected, and how the input data was affected. In the case of data lineage, the feedback message may specify or include a data lineage alert responsive to the data lineage structure, with the data lineage alert responsive to a data lineage rule executed on the incidence schema, or line of descent map (e.g., 'send an alert when user X has modified the input data.').

FIG. 2 shows another example implementation 200 of the architecture 110. The example implementation 200 includes communication interfaces 202 of the communication interface circuitry 120; system circuitry 204 of the repository processing circuitry 122; input/output (I/O) interfaces 206 and display circuitry 208 of the user interface circuitry 126. The display circuitry 208 may generate machine interfaces 210 locally or for remote display, such as in a web browser running on a local or remote machine. The machine interfaces 210 and the I/O interfaces 206 may include GUIs, touch sensitive displays, voice or facial recognition inputs, buttons, switches, speakers and any other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11b, g, n, or ac. The communication interfaces 202 may also include physical transceivers 216. The physical transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the architecture 110. For example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the architecture 110. The control parameters 226 provide and specify configuration and operating options for the control instructions 222, operating system 224, and other functionality of the architecture.

The architecture 110 may also include the enterprise data stores 250. The enterprise data stores 250 may represent any number of data sources 104 and may include a UMR 254, or any other enterprise data. The enterprise data stores 250 may be hosted on volume storage devices, e.g., hard disk drives (HDDs) and solid state disk drives (SDDs) and may adhere to a very wide range of data structures and data types. As examples, the data structures may include: SQL, no-SQL, object-oriented, and relational databases; unordered and ordered storage mechanisms; structured files; hash buckets; trees; and other structures. The data sources 104 may provide any type of input data to any number and type of enterprise workflows 236 defined within the enterprise. As just a few examples, the enterprise workflows 236 may include: human resources (HR) workflows that govern HR procedures such as hiring, reviews, and firing; banking workflows that create new client accounts, approve loans, or issue mortgages; manufacturing workflows that execute quality assurance procedures, process failure reports, and execute preventative maintenance; and customer service workflows that assign tasks to agents, processing claims, and resolve customer incident reports. Such enterprise workflows 236 may form the basis for the business context that is extrapolated from the technical context of the metadata as part of the holistic view of the universal metadata repository.

All of the workflows are driven by input data. The data sources 102 and 104 supply the input data to drive the workflows, and the source metadata characterizes the input data. Example input data includes, as just a few examples: database tables, columns, and fields; keyboard and mouse input; documents; graphs; metrics; files, such as Word, Excel, PowerPoint, PDF, Visio, CAD, Prezi files; application data objects, e.g., calendar entries, task lists, and email file folders; and other data types. Other examples of input data include attributes of the metadata such as, time stamps, data source ID, extraction tool used, and any other information that may be useful in characterizing the metadata in the holistic view.

The control instructions 222 include repository processing logic 230, data analytics logic 232, and machine interface generation logic 234. The repository processing logic 230 integrates source metadata into the UMR 254, and provides closed-loop feedback to the data sources responsive to data analyses driven by the UMR 254. The data analytics logic 232 performs the data analyses, including determining data quality metrics, and building and maintaining the data lineage structure. The machine interface generation logic 234 may create and deliver a holistic view such as an incidence schema in the form of a linked interactive set of GUIs that facilitate interaction within the architecture 110. The control instructions 222 may also, for example, be executed to identify workflows for analysis, determine data sources for those workflows, obtain source metadata from the data sources, obtain selections of data analyses to run, define closed-loop feedback rules, identify relations and inheritance among the source metadata, and allow operators to set configuration and preference parameters for the overall operation of the architecture 110.

Among other aspects, the enterprise data stores 104, repository processing logic 230, data analytics logic 232, machine interface generation logic 240 improve the functioning of the underlying computer hardware itself. That is, these features (among others described below) are specific improvements in the way that the underlying computer system operates. The improvements facilitate the generation of a universal holistic view of metadata across disparate data sources by integrating various different schemas within which the metadata is transformed to a single universal schema. Due to the universal schema present in the universal metadata repository, improvements in, for example, discovery of missing data (gap detection), and/or enrichment of the metadata by execution of data analytics across disparate data sources, may be performed to provide, among other things, closed-loop feedback that helps improve the execution of any defined workflow in the enterprise. The improved functioning of the underlying computer hardware itself achieves further technical benefits. For example, the architecture 110 automatically performs the complex processing needed to improve workflow performance, and thereby reduces manual intervention and reduces the possibility for human error. Still further, the architecture 110 facilitates a reduction in resource expenditure, including reduced storage volume accesses and processor-driven analytics due to, for example, data management using key data frames. Also, the architecture 110 operates with the key data frames in a distributed network environment to efficiently avoid duplicative data storage and large data transmission events among data sources distributed throughout a communication network. In addition, the architecture 110 may reduce or eliminates cumbersome and inexact manual tuning and analysis of the data sources and workflows, in favor of the centralized uniform schema metadata repository architecture stored in a distributed data storage system.

Figure 3:
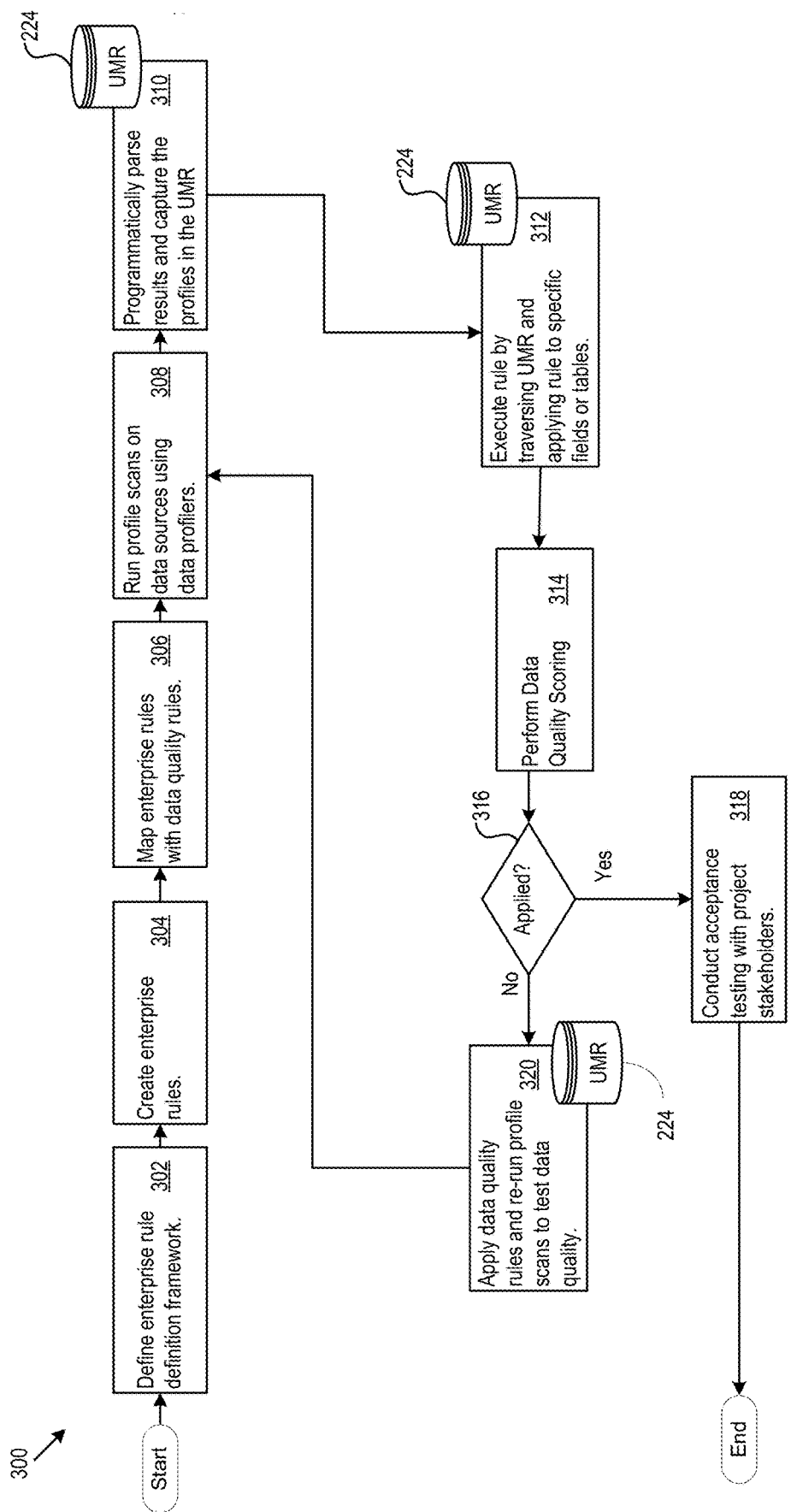
FIG. 3 shows an example of logic that the architecture may implement for analyzing data quality.

FIG. 3 shows an example of logic 300 that the architecture 110 may implement for analyzing data quality, e.g., as part of the data analytics logic 232. The architecture 110 defines an enterprise rule definition framework (302), in which the architecture 110 creates enterprise rules (304) for its data. The architecture 110 maps enterprise rules to data quality rules (306). The data quality rules define quality metrics for the input data to the workflows. The enterprise rules may be specific to a business or industry.

The architecture 110 executes data profilers or data mappers to run profile scans on the data sources (308) to obtain the dataset of source metadata, such as technical metadata objects. The data profilers may be metadata scraping tools such as, for example, ATTIVIO, EMCIEN, CLOUDERA NAVIGATOR, SINEQUA or UNIFI, which include functionality to extract metadata from data sources. The scan results are parsed for data elements such as codes and scripts, and the scan profiles are captured (e.g. stored) in the UMR 254 (310). Next, the architecture 110 performs dynamic data analysis by executing the data quality rules, e.g., by traversing the structure of the UMR 254 and applying each data quality rule to the applicable field, table, column or other data element (312). As part of execution of the data quality rules, the architecture may dynamically perform data quality scoring (314) to obtain data quality metrics. The data quality scores generated by the data quality scoring may be stored as part of the data quality metrics in the UMR 224 in association with the respective data. Once all the data quality rules are applied and the data quality scoring is complete (316), the architecture 110 may conduct computer based acceptance testing (318). Acceptance testing may include issuing, as appropriate, feedback messages to the data sources. Acceptance testing may include consideration of data quality metrics and data lineage scores, as well as consideration of relations, inheritance, reference or any other data reconciliation, authentication and completeness parameters. Otherwise, if there are more, different, or new data quality rules to apply, the architecture 110 re-runs the profile scans using the same or different mappers to continue to test the data quality (320). In an example, the data quality scores may be used in the acceptance testing and to determine if more, different, or new data quality rules should be applied. The architecture 110 may alternatively, or in addition, conduct acceptance testing of the workflow, or take other actions once the scan profiles are parsed.

Figure 4:
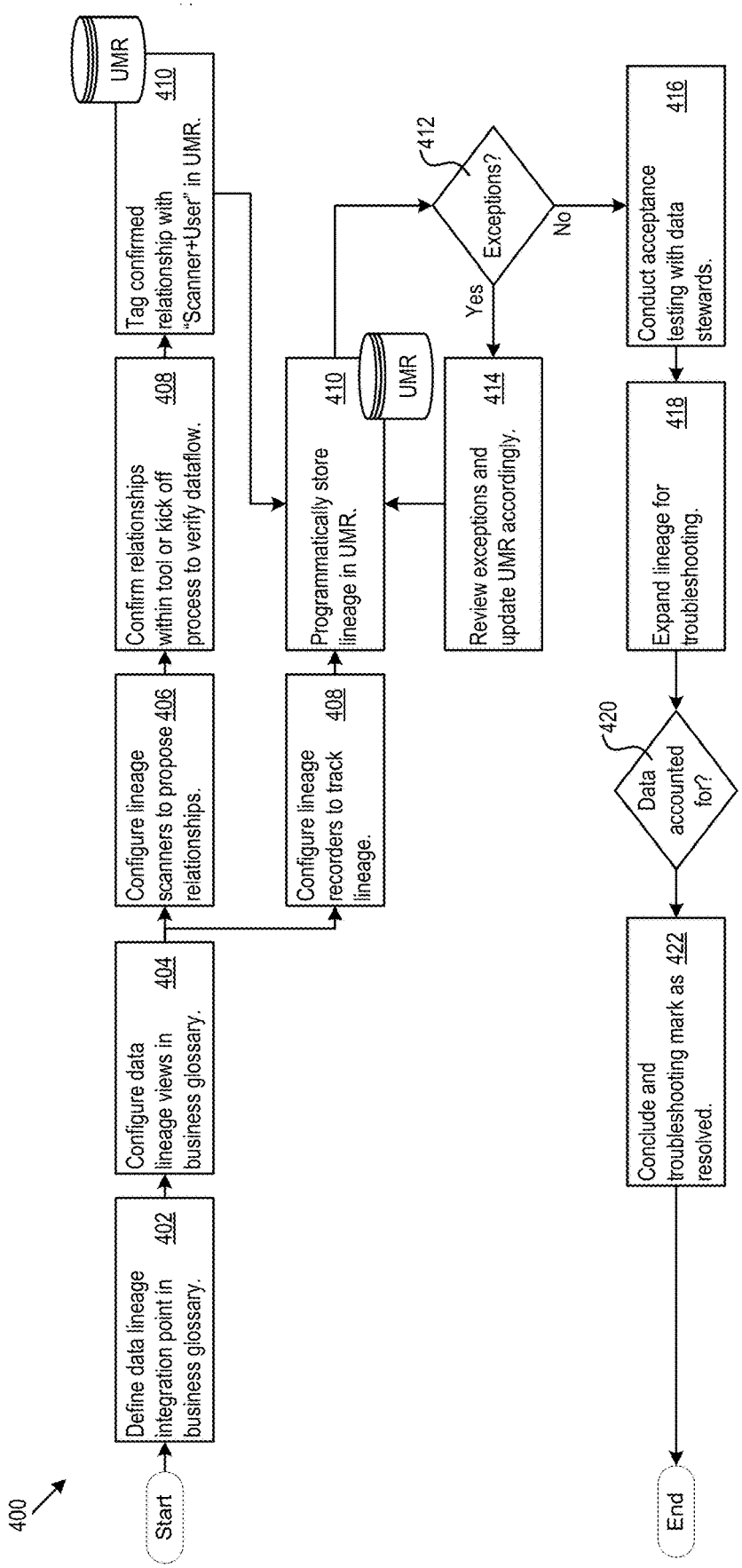
FIG. 4 shows an example of logic that the architecture may implement for analyzing data lineage.

FIG. 4 shows an example of logic 400 that the architecture may implement for handling data lineage. The architecture 110 defines data lineage integration points in a business glossary (402) as key data frames and configures data lineage views in the business glossary (404) by integration of the technical context into the business context. The business glossary may be descriptive of the business related data used in one or more enterprises or organizations and may include business metadata. The business glossary may be maintained and provided with a data governance platform, such as COLLIBRA.

For unconfirmed relationships within the metadata in the universal metadata repository, the architecture 110 may configure lineage scanners, or mappers, to proceed with proposed relationships (406) based on the metadata, attributes and related information, and use a review tool to confirm the relationships to verify the dataflow (408). The lineage scanners may tools such as, for example, ALATION and CLOUDERA NAVIGATOR. The architecture 110 tags confirmed relationships in the UMR 254 (410). For confirmed relationships, the architecture 110 configures the lineage scanners to track the known lineage (408). In either case, the architecture 110 programmatically stores the data lineage in the UMR 254 (410).

The architecture 110 determines whether there are any exceptions (412), and if so, those exceptions are reviewed and the UMR 254 updates to resolve the exceptions (414). When there are no exceptions, the architecture 110 conducts acceptance testing (416). In any case, the architecture 110 may selectively expand the data lineage, e.g., for troubleshooting purposes (418). When all the data is accounted for (420), the architecture 110 may conclude troubleshooting and mark the issue as resolved (422).

Figure 5:
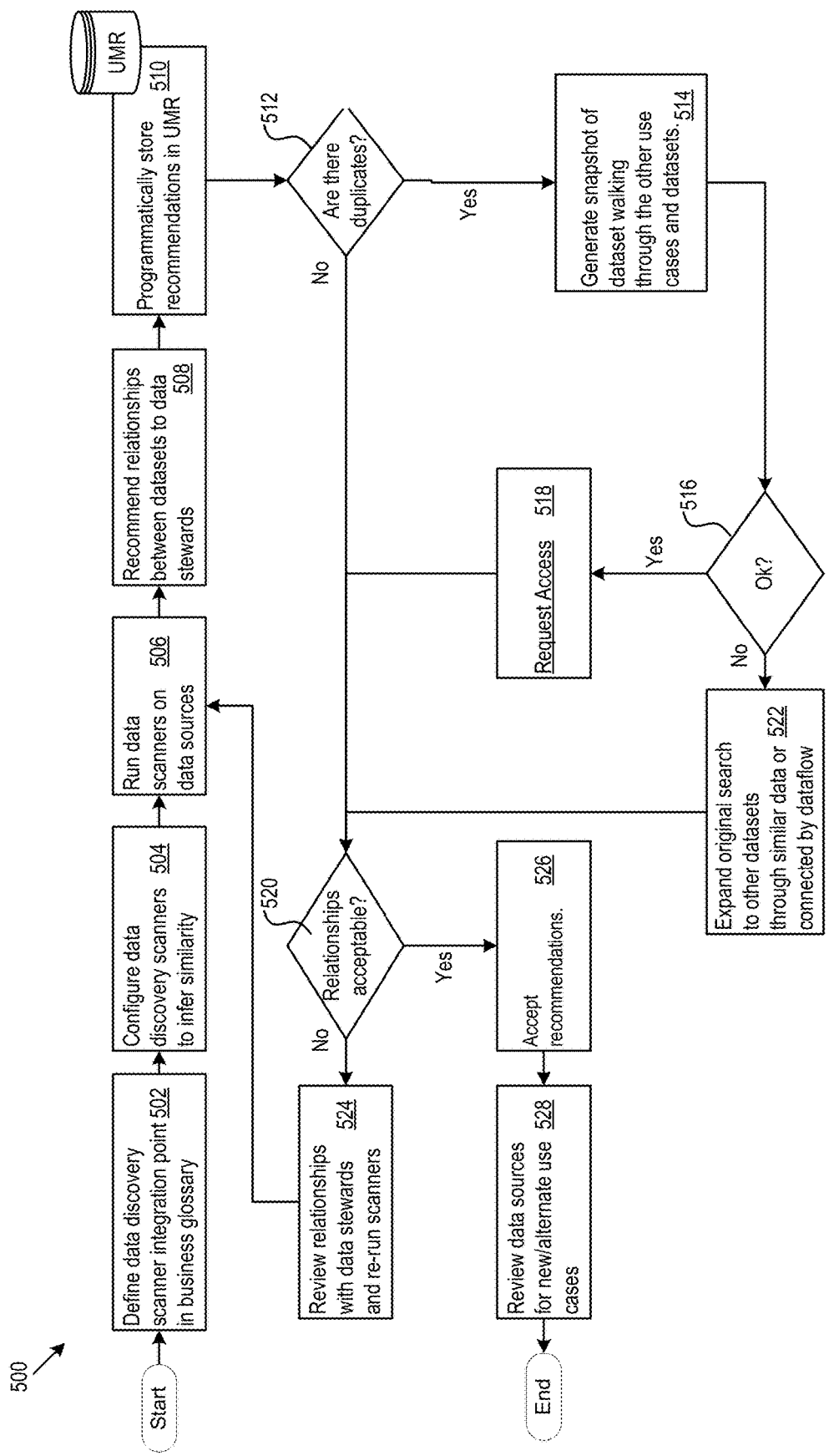
FIG. 5 shows an example of logic that the architecture may implement for performing data discovery.

As mentioned above, the architecture 110 performs discovery of additional data via, e.g., similarity detection. FIG. 5 shows an example of logic 500 that the architecture 110 may implement for performing data discovery. The architecture 110 defines a data discovery scanner integration point in a business glossary (502), and configures data discovery scanners to infer similarity (504), using, e.g., pre-defined similarity rulesets. The architecture 110 runs data scanners on the data sources (506) and determine relationships between data sets based on the inferred similarities, which are recommended to data stewards (508). The determined relationships are programmatically stored in the UMR 254 (510).

The determined relationships may also be parsed for duplicates as part of the quality analysis (512). Where there are duplicates in the relationships, a snapshot of a dataset of source metadata from a data source in which the duplicates exist in relation to other datasets of source metadata may be generated to identify preferred data sources and a route of the relationships by walking through other use cases and the dataset (514). The architecture 110 may sample the data set of identified preferred data sources to determine if the data in the preferred data set is ok (516). If the data in the data set of the identified preferred data source is ok, access to the preferred data source may be requested (518), and the architecture 110 checks for whether the recommended relationships meets pre-defined acceptability criteria (520). If the relationship to the identified preferred data source is not acceptable, the architecture 110 may expand the search for relationships to other data sets, by, for example, identifying similar data in other data sets, or by identifying data sets that are connected by data flow to the identified preferred data source (522).

If the recommended relationships are not acceptable, then the architecture 110 modifies or drops the recommended relationships and re-runs the data scanners (524). When the recommended relationships are accepted (526), the architecture 110 may save those relationships, and continue to review the data sources into the future for new data relationships (528).

The architecture 110 addresses the technical challenges with managing data sources and summarizing their content. Many of these challenges arise due to the wide range of data sources, varying interfaces, varying accessibility standards, disparate data sources both internal and external to the enterprise, and/or variations in schemas of the extracted content. The architecture 100 provides a unified schema that provides a view of metadata, data lineage, and data quality for a system or set of systems, leading to much improved ability to track and maintain the information, while reducing errors. The architecture 100 understands the dichotomy of documents, data sources, source clusters, and source composition and defines a holistic model of metadata describing system state.

The architecture 100 also monitors and improves data quality. In that regard, the architecture 100 may define data quality metrics in terms of completeness, accuracy, precision, timeliness, reasonableness, or other factors. Additional data quality metrics include whether there is data duplication, the veracity/integrity of the data, and the coverage of the data. With regard to data lineage, the architecture 110 tracks aspects of data lineage including the 'who', 'what', 'when', 'where', 'why', and 'how' characteristics of the data. The data lineage may be discrete, probabilistic or both.

Figure 6:
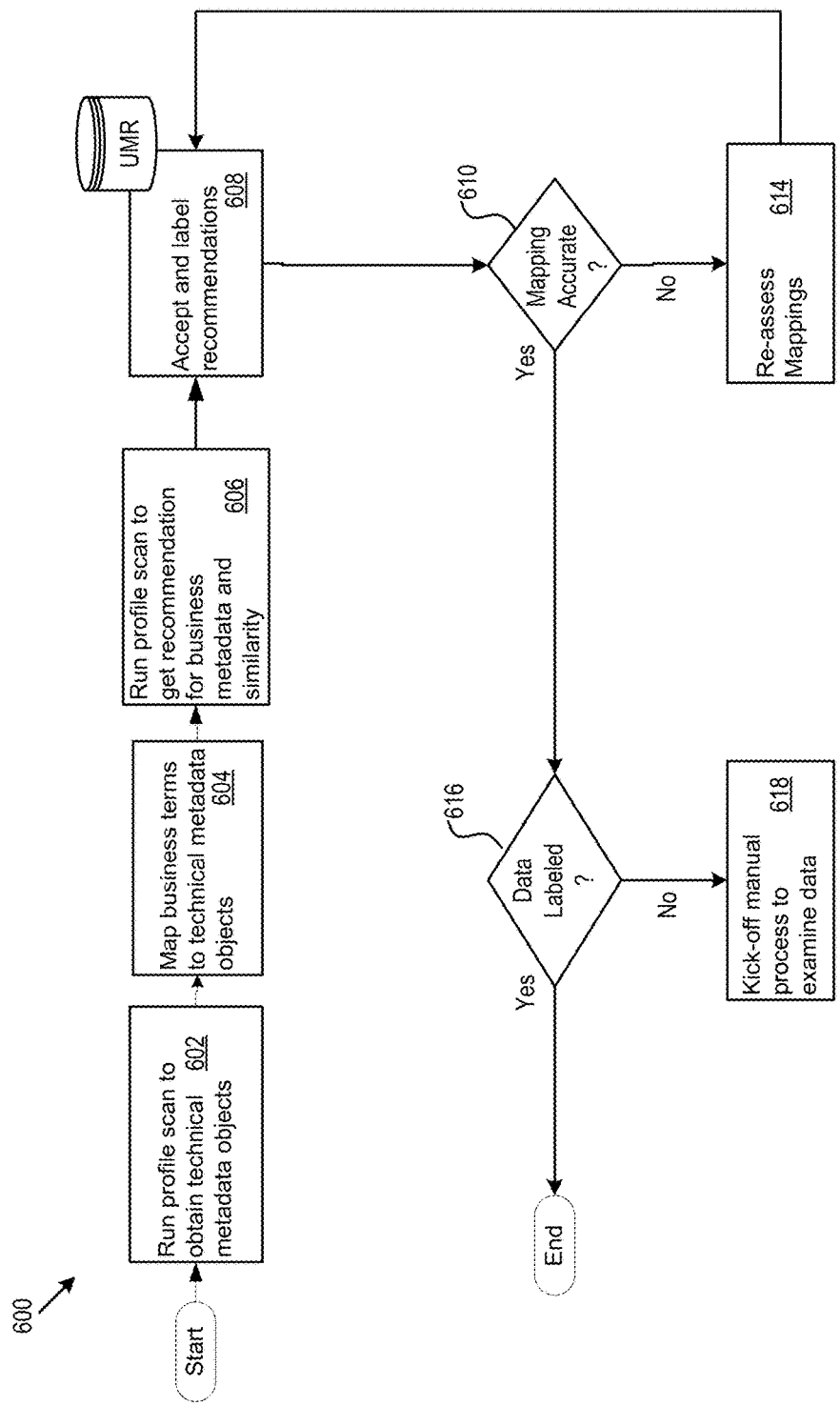
FIG. 6 shows an example of logic that the architecture may implement for performing mapping of business metadata to technical metadata objects.

FIG. 6 shows an example of logic 600 that the architecture 110 may implement for performing mapping of business metadata to technical metadata objects. Business context descriptive of an organization may be included in business metadata, such as data usage and ownership, stored in a business glossary. The architecture 110 executes data profilers or data mappers to run profile scans on the data sources to obtain a profile of respective input data in the form of a dataset of source metadata, such as technical metadata objects (602). The technical metadata objects may be mapped to business terms included in the business glossary (604) using, for example, data analytics and automated inferences. In an example, data analytics may be performed by a scanner tool such as CAMBRIDGE SEMANTICS to create computer based inferences that may be used to map business terms to technical metadata objects by, for example, discovering semantic similarities and syntactic similarities between the business terms and selected technical metadata objects. The architecture may run a profile scan of the data source to obtain a recommendation for business metadata and similarities, such as semantic similarities and syntactic similarities (606). The technical metadata objects may be labeled with the mapping to the business metadata (608).

The architecture 110 may determine the accuracy of the mapping, such as using quality control functions (610). If the mapping is not accurate, such as not exceeding a predetermined threshold of accuracy, the architecture 110 may re-assess the mappings (614) and then accept and label the new recommendations (608). If the mapping is accurate, the architecture may determine if a predetermined amount of data is labeled with mappings (616) If not, a manual process may be initiated by the architecture 110 to examine and assess the data (618). Otherwise, the process may end.

Figure 7:
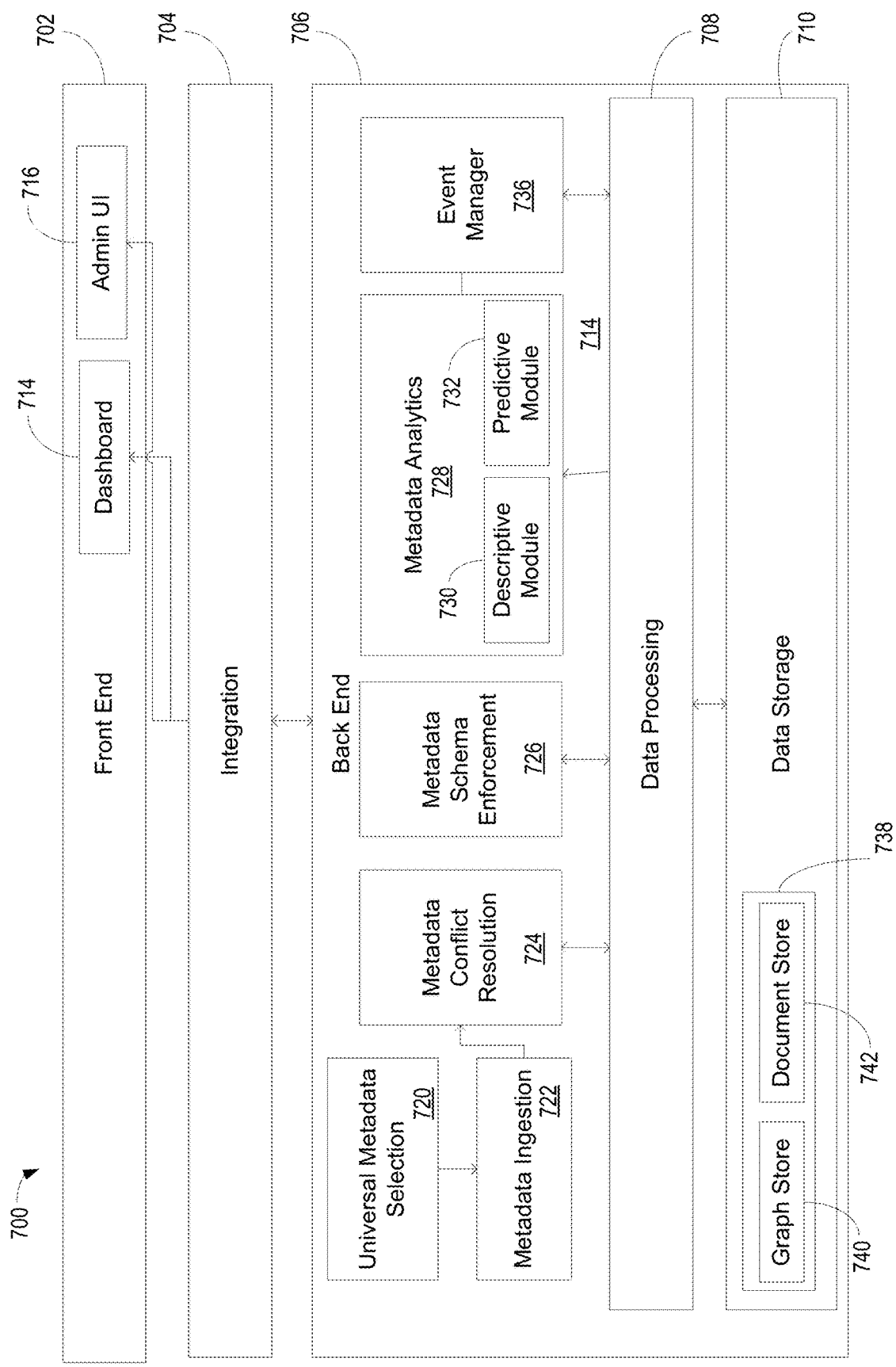
FIG. 7 is a block diagram illustrating an example of the functionality of the architecture.

FIG. 7 is a block diagram illustrating an example of the functionality of the architecture 110. The architecture 110 may include a front end layer 702, an integration layer 704, a back end layer 706, a data processing circuitry 708 and a data storage circuitry 710. In other examples, additional or fewer layers may be included to depict the described functionality. The front end layer may include a dashboard 714 for user interaction with the architecture 110 and an administrative user interface 716 to manage and maintain the architecture 110.

The integration layer 704 of the architecture 110 may be a form of middleware providing an interface between the front end layer 702 and the back end layer 706. The middleware may operate as a stateless, client-server, cacheable web-based communication protocol for networking. In an example implementation, the middleware may include an application program interface (API), such as a RESTful API.

The back end layer 706 of the architecture 110 may be included in the repository processing circuitry 122 (FIG. 1). The back end layer 706 may perform computer implemented metadata collection and normalization across a data supply chain in a number of distinct phases, which may be described as selection, ingestion, data management, and data preparation. In addition, the architecture 110 may use the back end layer 706 to perform computer implemented conflict resolution during distinct phases of quality and reconciliation, and actionable management.

The selection phase may be performed with a universal metadata selection circuitry 720. The universal metadata selection circuitry 720 may consume metadata information from the data sources, and determine where to get additional metadata information from among the various available data sources. Thus, the universal metadata selection circuitry 720 may consume workflow information or job tasks, from vendor solutions and resolve the data sources of interest. In addition, the universal metadata selection circuitry 720 may perform communication with the different data sources, such as by enabling querying of the data sources and/or the various profiling tools or data mappers used to scrape data from the different data sources. Functionality of the universal metadata selection circuitry 720 may include source profiling, parsing, archiving and retention. The universal metadata selection circuitry 720 may perform exploration of existing data sources resulting in simplified onboarding of data sources. Onboarding of data sources may include cataloging and indexing trusted data sources, as well as onboarding new data sources and configure transformation rules for metadata extracted from such new data sources.

The ingestion phase may be performed by a metadata ingestion circuitry 122. The metadata ingestion circuitry 122 may normalize different metadata schemas from the data sources into a target format and object schema that is common across the universal metadata repository. For example, the metadata ingestion circuitry 122 may provide normalization of metadata through a series of connectors to an ingestible formation, such from a non JSON data to JSON data across the different schemas.

Since the format of the raw metadata in the different schemas may vary significantly, the metadata ingestion circuitry 122 may reconcile the various disparate formats into a common schema format in the universal metadata repository. Further, extracted source data may be archive loaded for auditability by the metadata ingestion circuitry 122.

The back end layer 706 may also include a metadata conflict resolution circuitry 724 and a metadata schema enforcement circuitry 726. The metadata conflict resolution circuitry 724 may perform metadata object matching and conflict resolution among data from different data sources. Accordingly, the metadata conflict resolution circuitry 724 may resolve any duplicated information by identification and deletion of repeated metadata within the universal metadata repository once the metadata from the different data sources has been normalized and duplication can be recognized. Thus, the metadata conflict resolution circuitry 724 may "clean" the data received in the universal metadata repository.

The metadata schema enforcement circuitry 726 may provide/handle harmonization of technical metadata across diverse metadata stores included in a data storage layer of the architecture 110 and/or data sources. For example, the metadata schema enforcement circuitry 726 may maintain metadata and schema alignment and perform computational work, such as last minute normalization, canonization check/data resolution and the like. In addition, the metadata schema enforcement circuitry 726 may perform storage and processing of data in structured and un-structured data formats in a UMR data store 738 included in the data storage layer of the architecture 110. Also, the metadata schema enforcement circuitry 726 may catalog the data sources and perform mapping of the origin of the metadata within the attributes of the metadata. Also, the metadata schema enforcement circuitry 726 may detect specific datatypes, assign metadata tags, and route the metadata to predetermined queues resulting in accelerated data management with type-based patterns. Routing of the metadata to the predetermined queues may include routing the key data frames and mapping of the destination in which the metadata is stored by including such information in attributes associated with the metadata.

The metadata analytics circuitry 728 represents a repository of algorithms, links to algorithms, and links to tools that perform analytical operations on the UMR and source data to provide a more holistic view of the underlying data. The metadata analytics circuitry 728 may include a descriptive module 730 and a predictive module 732 to perform data quality metric analysis and data lineage development and analysis. Based on the data quality metrics analysis and the data lineage analysis, the metadata analytics circuitry 728 may identify key data frames among the dataset of source metadata from a data source.

The key data frames may be representative of a larger body of metadata such that the key data frames provided a sampled version of the metadata. In other words, instead of the architecture 110 duplicative storing the entirety of the metadata received from a data source, only the key data frames are stored. The key data frames may include attributes that point to the location (e.g. the data source) of the metadata being represented by a respective key data frame. Using the key data frames, data quality metrics and data lineage measurements may be developed to provide a holistic view of the entirety of the metadata represented in the universal metadata repository.

The metadata analytics circuitry 728 may mine the normalized data from the various data sources for data probabilistic lineage metadata. In addition, the metadata analytics circuitry 728 may leverage the normalized data that has been quality reviewed through the metadata conflict resolution circuitry 724 and the metadata schema enforcement circuitry 726. Through analysis of the collected and normalized metadata, the data quality metrics and the probabilistic lineage metadata, the key data frames may be identified in the dataset of source metadata from each respective data source.

The metadata analytics circuitry 728 may also review the metadata represented in the universal metadata repository for gaps or missing parts of the metadata. Such gaps may be identified from computer based performance of data quality and data lineage using the descriptive module 730 and the predictive module 732. When gaps in the metadata are discovered, the metadata analytics circuitry 728 may perform enrichment of the universal metadata repository by identifying a data source capable of at least partially filling the gap, extracting metadata information, and normalizing such metadata in order to add the newly extracted metadata to the universal metadata repository.

The event manager 736 may determines what jobs to schedule based on predefined and curated rules of interest. The event manager 736 may detect changes and acts as a scheduler for processing future tasks based on events of interest. The event manager 736 may monitor for triggering events using rules based logic. In addition, the event manager 736 may perform management of business rules to assign metadata tags and route loaded source data. Actionable management by the event manager 736 may include centralize management of data use and rules to provide role based user access and permissions, and centralized management of business rules and workflows.

Accordingly, the architecture 110 may be used to integrate all data profiles and similarity profiles across the entire platform. This approach also includes a feedback loop that enforces the business rules and re-runs the scans automatically to update the universal metadata repository. The architecture 110 may apply the rules defined on specific columns or fields. The event manager 736 may check to ensure the rules are applied and specifies any additional rules using a check rules match function. The architecture 110 may re-run the profiles and similarity scans to update the data quality metrics as per the newly applied rules.

Figure 8:
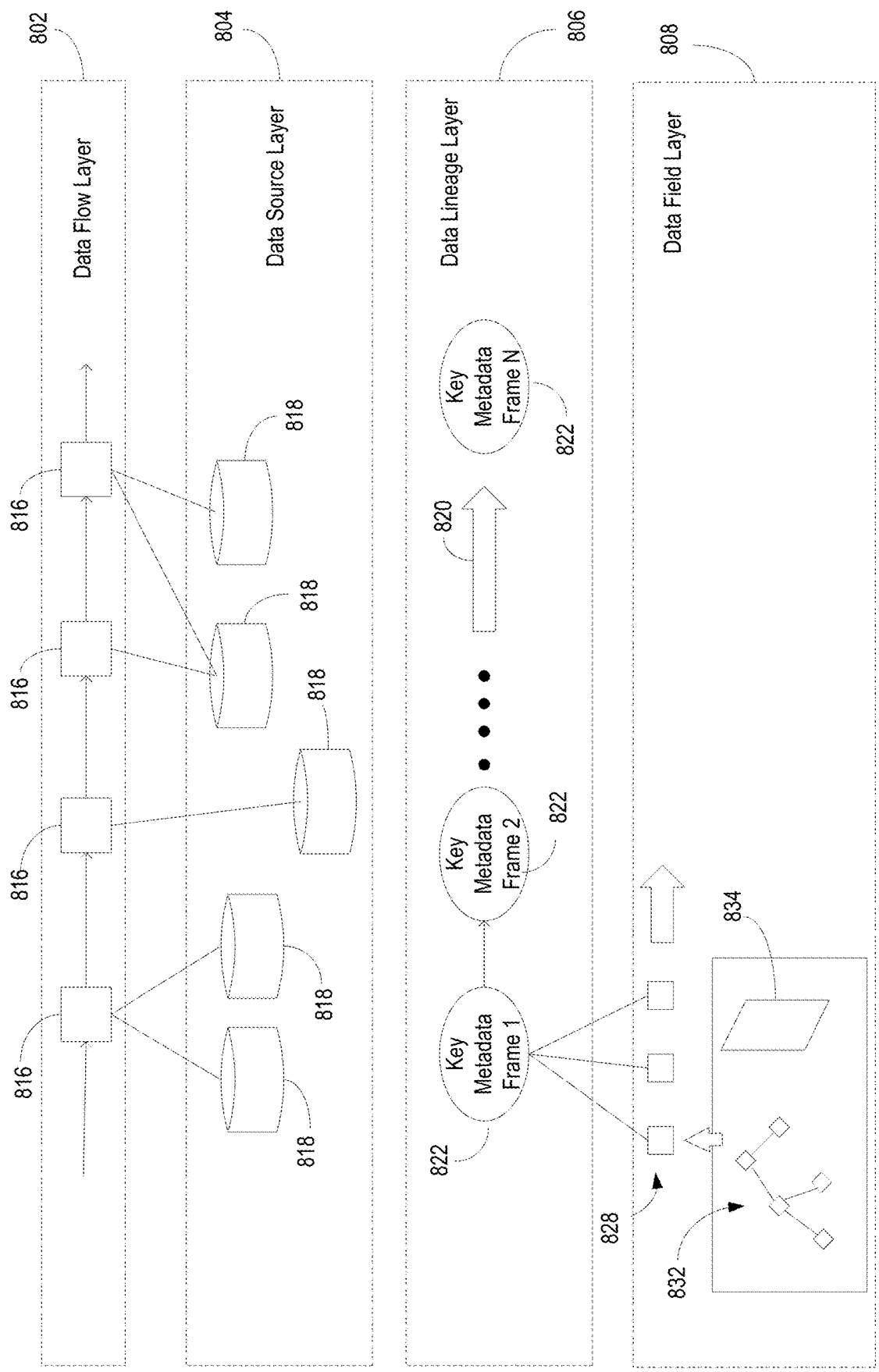
FIG. 8 is a block diagram of an example of logic layers included within the architecture.

FIG. 8 is a block diagram of an example of logic layers included within the architecture 110. The various circuitry or engines present in the back end 706 may operate within these logic layers to perform the described functionality. The architecture 110 may include a data flow layer 802, a data source layer 804, a data lineage layer 806, and a data field layer 808. In other examples, fewer or greater numbers of layers may be used to illustrate the functionality described herein.

With reference to FIGS. 7 and 8, the universal metadata selection circuitry 720 may operate in the data flow layer 802 to capture transaction data 816 from data sources 818 in the data source layer 804. The transaction data 816 may also be referred to as a dataset of source metadata from a data source. Capture of transaction flow data 816 may be performed with a tool, such as CLOUDERA NAVIGATOR. The transactions 816 are represented as a graphical flow as data moves through system (can be used to show prescriptive lineage for known processes). The universal metadata selection circuitry 720 may also map transaction source data sources and transaction destinations within the dataflow layer 802.

The metadata ingestion circuitry 722 may operate in the data source layer 804. The metadata ingestion circuitry 722 may also map transactions to the data sources 818 (push and pull) and catalog all of the data sources 818 in the data source layer 804. Data sources 818 may be discovered from the transaction/process flow graph by the metadata ingestion circuitry 722 in the data source layer 804. Also, metadata information may be represented in the data source layer 804 to a "table" or "document" level of data granularity.

Within the data lineage layer 806, the metadata analytics circuitry 728 may determine a data lineage timeline 820 that consists of key data frames 822. Using the key data frames 822, the architecture 110 may track lineage at key points in time. In addition, the architecture 110 may provide historic, prescriptive, and probabilistic lineage. The key data frames 822 may be pointers to profiles containing the dataset of the source metadata of each respective data source 818. In an example, the data set of source metadata from each data source (e.g. transaction) may be represented with one key data frame. However, in other examples, a data set may be represented by multiple key data frames 822. The key data frames 822 are updated by time, event, signification change or other operational attributes, which are associated with the respective key data frames 822. In an example, updates may be constrained by: desired granularity, space, or triggers from the event management 736.

In FIG. 8, a timeline flow of key data frames 822 are depicted by the data lineage timeline 820. The depicted data lineage time line 820 illustrates a flow where each key data frame 822 points to at least one data profile, to indicate timing of when a dataset of source metadata was obtained from a respective data source 818. The lineage timeline 820 may be created by, for example, time sampling to create a data profile at consistent predetermined time intervals. Alternatively, or in addition, the lineage timeline 820 may be based on an event being triggered. In the event trigger scenario the data profile transaction may be extracted based upon a rule (e.g. data upload, etc.) triggered by the event manager 706. Alternatively, or in addition, the lineage timeline 820 may be generated based on, for example, change monitoring. For example, data profiling may occur when there is a significant change in data from a previous profile time (e.g. value drift, significant data upload, etc.) Occurrence of a significant change may be based on a predetermined set point or threshold which is compared at the respective data source 818 to previously received metadata parameters. The comparison may occur at a predetermined time, or frequency, or in response to an event.

The data field layer 808 may include field information within data source fields 828 of the key data frames 822. The metadata analytics circuitry 728 may operate in the data field layer 808 to generate the data source fields 828 for the key data fields 822. The data source fields 828 may include information such as: i. What fields are composed of and inter database relationships, ii. Field composition metrics (e.g. distribution, data types, and other attributes related to generation of a respective key data field) and/or iii. Field data quality metrics such as value composition, value coverage, heterogeneity/distinctness and the like. The data source fields 828 may be generated with a predetermined structure. In an example, each of the data source fields 828 may be generated in a basic JSON structure such as:

```
{
Profile:
Metadata:
ColumnStatistics:
DataQuality: {Fields Rules}
}
```

The metadata analytics circuitry 728 may also generate a data field composition in the form of a graph schema 832 of the lineage data to model the relational composition of the metadata represented by the key data frames 822. The relational composition may be abstractly modeled with an object oriented approach to provide a visual illustration of the traits or aspects of the data sources, metadata, key data frames and the operational aspects of metadata collection and the relationships therebetween. In addition, time stamping, logic rules, attributes, definitions and the like may be used for inferencing of relatedness of the technical context to the business context. The depiction of the relational composition of the graph schema 832 may be based on data field statistics 834 and allow the architecture to traverse the graph schema 832 from top to bottom.

Referring again to FIG. 7, the data processing circuitry 708 may perform real time processing of data. In addition to handling payload passing, the data processing circuitry 708 also defines the data workflow of the entire UMR system in that it handles all job executions and the passing of data between circuitry, jobs, engines, and modules.

The data storage circuitry 710 provides an interface to the universal metadata repository, which is a UMR data store 738 included in the architecture 110, which includes both a graph store 740 and a document store 742. The interfacing with the document store 742 may include interface with, for example, HADOOP, cloud storage, and NoSQL storage facilities, such as MONGO. Interfacing with the graph store 740 may include interfacing with, for example, NEO4i.

The graph store 740 holds information with regard to the relationship linkages between pieces of data that is ingested and the document store 742 contains the detailed information of data. The graph store 740 itself is comprised of a technical context and a business context which are two graphs that are loosely connected. The technical graph contains all information and relationships with regard to data, infrastructure, and transactions that occur on the data. The business context graph contains concepts, rules, reports, etc. that are used to understand and make business decisions. The two graphs are separated to serve the purpose of a strong technical underpinning where traversal is well known and a business graph that is specific to a use case, domain, client, or industry. The business graph serves as a knowledge piece that is exportable and reusable. For example, key aspects of a business graph may reused for differing domains, businesses, industries and the like. In addition, the business graph may be exportable and reusable by being bootstrapped with existing ontologies to kick start an engagement of the architecture 110 with a different business entity or industry. Conversely the business graph may be removed without effecting the underlying infrastructure representation in the technical manifestation (e.g. technical context) of the collected metadata.

Figure 9:
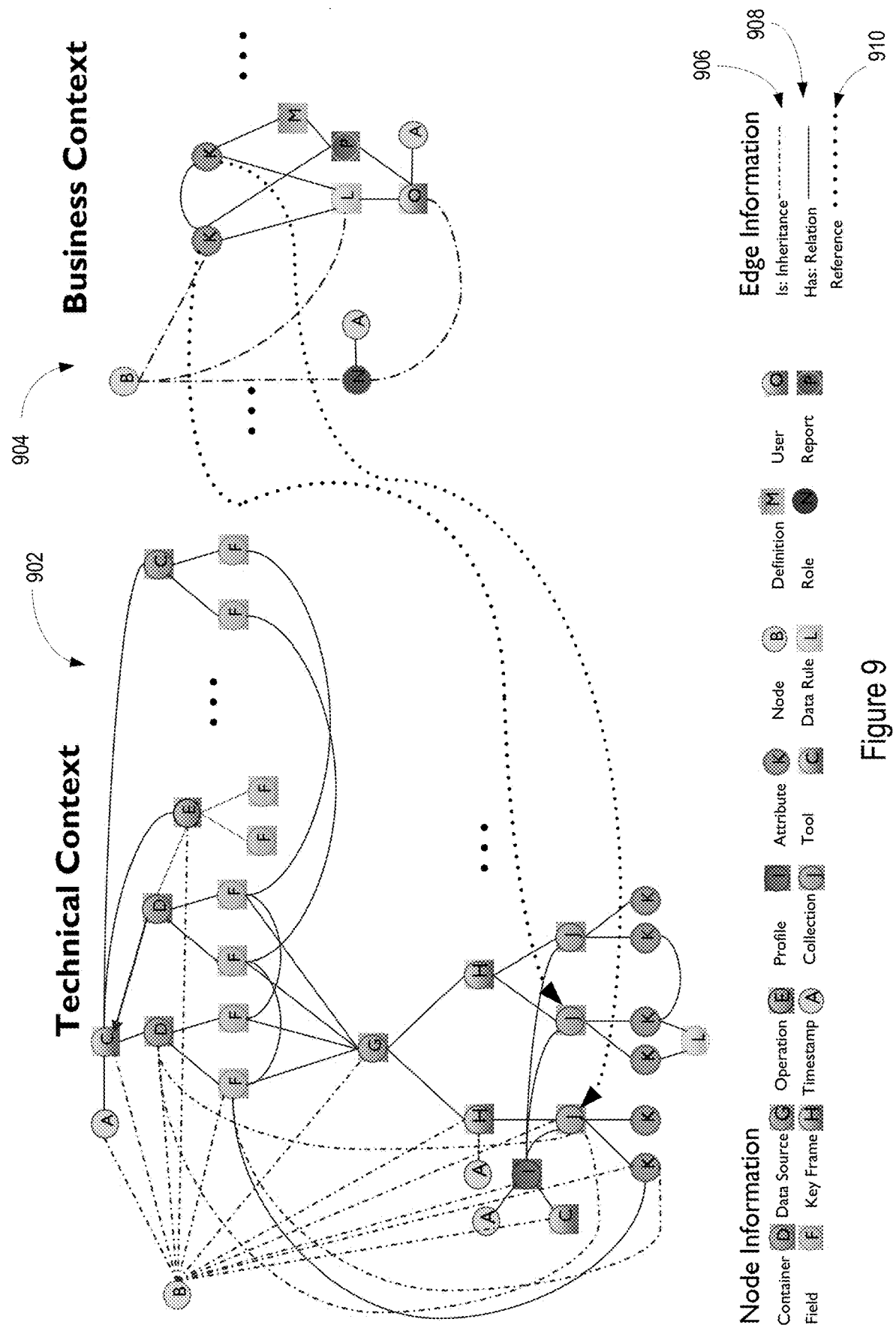
FIG. 9 is an example of a incidence graph schema for the architecture.

FIG. 9 is an example of a incidence graph schema 900 for the architecture 110. The incidence graph schema may represent the UMR by consolidating and presenting a shared view of all metadata across data sources, data types, data stores, and application uses of the data. The incidence graph schema 900 includes an example of a technical context graph 902 and a business context graph 904 which can depict normalized metadata from different data sources and information related thereto. The technical context graph 902 may depict Information about the applications, tools, and systems supporting a data management solution. The business context graph 904 may depict Information that describes the process, context and meaning about the data. The business context graph depiction may place emphasis on significance of data from a business point of view.

In FIG. 9, the incidence graphs visually depict inheritance 906 as interconnecting dot-dash-dot lines, relations 908 as interconnecting solid lines, and reference 910 as dotted lines. The technical context graph 902 and the business context graph 904 may include representations of time stamps (A), nodes (B), Tools (C), Containers (D), Operation (E), Field (F), Data Source (G), Key Data Frame (H), Profile (I), Collection (J), Attribute (K), Data Rule (L), Definition (M), Role (N), User (O), and Report (P). In other examples, additional or fewer representations may be included in the incidence graph schema 900.

In FIG. 9, inheritance and relationships are only illustrated under one example, and one link for brevity. In addition, all vertices are of type Node (B) and inherit all the properties. Further, the user (O) inherits the Role (N), and key data frames inherit Timestamps (A). In general, the inheritance 906 included in the incidence graph schema 900 may indicate where various attributes and/or information is provided from (origin or source). The incidence graph schema 900 also illustrates relations 908, such as "is a," "derived from," "instance of," and "consists of."

For example, a tool (C), such as EMCIEM or CLOUD-ERA NAVIGATOR MCM, may be represented and added data such as a timestamp (A) may be a relation 908 shown as an "instance of" the tool (C). In addition, the tool (C) may have one or more relations 908 to containers (D) which "is a" container of the tool, and an operation (E), which "is a" operation of the tool. The container (D) and the operation (E) may include relations 908 to fields (F) which "is a" field of the respective container (D) and the operation (E), and may be identified with a relation 908 to other fields (F) which are an "instance of" another field (F). In another example, a Collection (J), such as a table, may have a relation indicating the table "consists of" a number of different attributes (K), some of which may have a relation of being "derived from" a data rule (L).

In this way, the incidence graph may be used in different analysis scenarios to present information that would not otherwise be available due to the normalization of metadata received from different data sources, and due to the inheritance 906, relation 908 and reference 910 represented therein. For example, the graph schema may be used to search for data received, for example, from a certain tool (C), and this same type of framework may be used to develop data lineage scores. For example, if the meta data includes a combination of manually entered data and tool obtained data, a data lineage score may be determined. The data lineage score may be based on "derived from" relations 908. For example, if the incidence graph included ten nodes (B), and nine out of ten of the nodes (B) have a derived from link, than the data lineage score would be 90. In another example, in a search for reliability of relationships between collections (J) of key data frames (H), a number of attributes (K) having a relation 908 of "instance of" may be used to determine a data lineage score. Thus, two collections (J) with a large number of attributes that are "instances of" each other will have a higher data lineage score.

The reference 910 may indicate that elements of one of the technical context graph or the business context graph is used in elements of the other of the technical context graph or the business context graph. The reference 910 may be created by providing reference to information that is technical context information or business context information. For example, as illustrated in FIG. 9 the collection (J) in the technical context graph 902 may include an indication that an origin of information included therein is an attribute (K) included in the business context graph 904.

Figure 10:
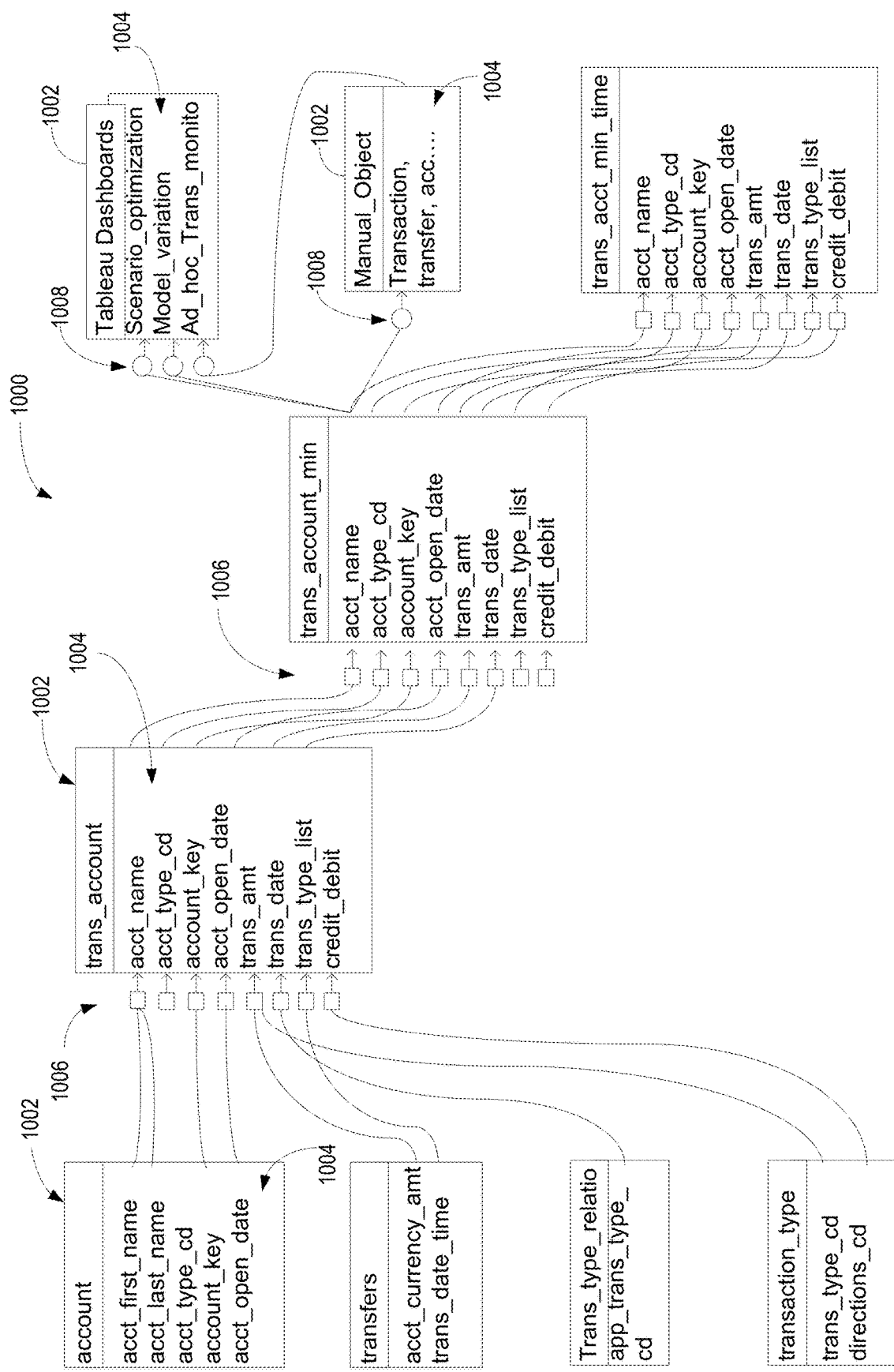
FIG. 10 is an example depicting a lineage data structure.

FIG. 10 is an example depicting a lineage data structure 1000. The lineage data structure 1000 illustrates different collections 1002 that depict relations 908 between different fields 1004. Also illustrated are calculators 1006 to indicate whether the relations 908 between the fields include a computer based transformation, calculation or aggregation. In addition, illustrated are transformers 1008, which are representative of predetermined constants, formulas or mathematical functions.

Figure 11:
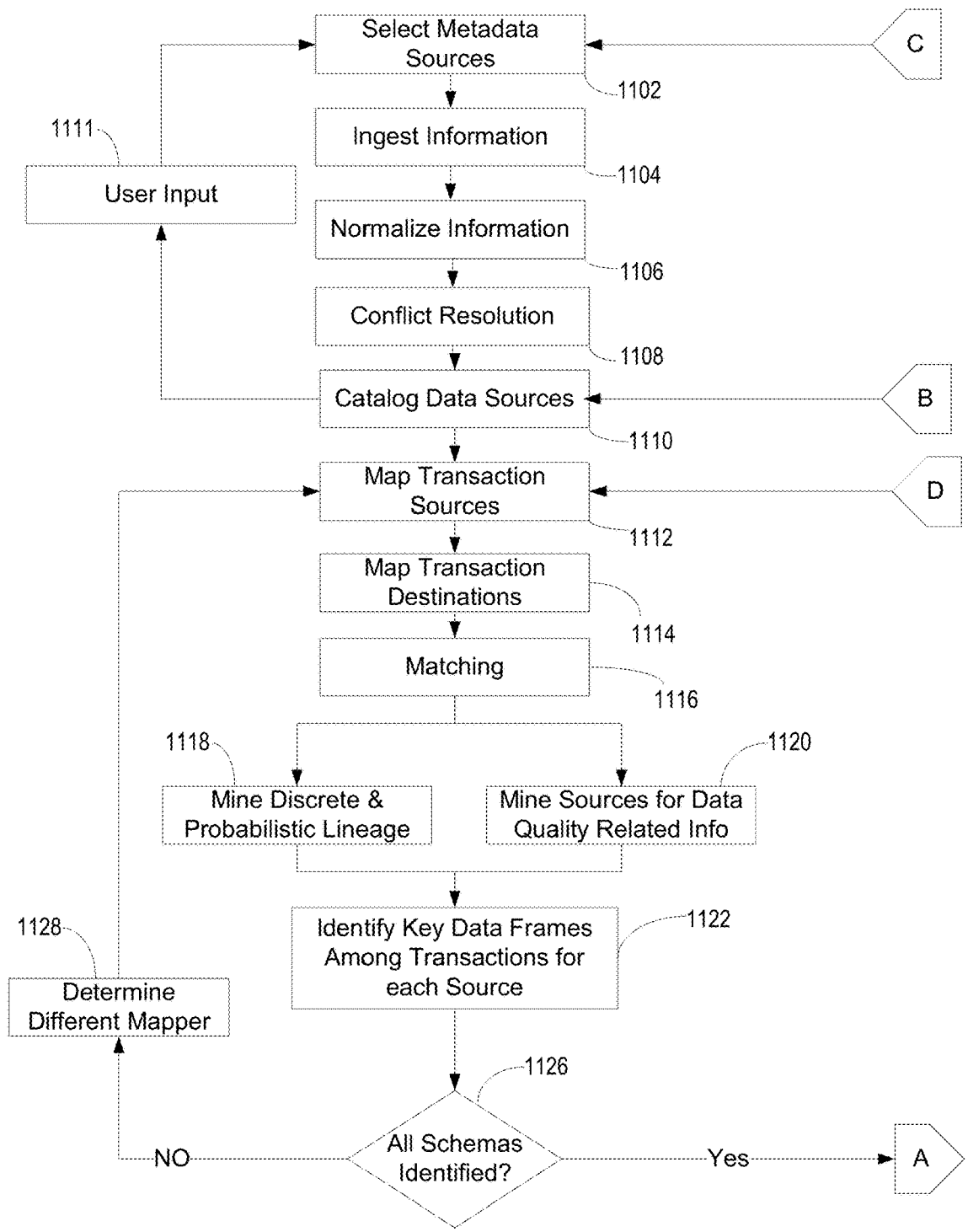
FIG. 11 is an operational flow diagram illustrating example operation of the architecture.

FIG. 11 is an operational flow diagram illustrating example operation of the architecture. Referring to FIGS. 7, 8 and 11, the universal metadata selection circuitry 720 may identify and select data sources 818 to be sources of metadata and provide transaction flow data 816 (1102). The metadata ingestion circuitry 722 may ingest the metadata information (1104) and reconcile the data by normalizing the information (1106). The metadata conflict resolution circuitry 724 may review the normalized information for conflicting information (1108) using, for example, machine learning and artificial intelligence (AI). The metadata conflict resolution circuitry 724 may also catalog all of the data sources from which metadata is obtained (1110). User input regarding identification of additional data sources to add to the catalog may be received (1111), and the operation may return to selecting metadata sources (1102). In addition, the metadata conflict resolution circuitry 724 may map the transactions to the data sources (1112) and map the transactions to the data destinations (1114) as part of creating information for the lineage group structure. The catalog of data sources and the source and destination mapping may be stored in the universal metadata repository.

The metadata schema enforcement circuitry 726 may also perform schema reconciliation by matching mappers to different schemas to determine which pieces of data bind different schemas together (1116). Schema reconciliation may also include mining data sources for probabilistic values and discrete values for completion of lineage relationships (1118) within the incidence schema. In addition, schema reconciliation may include mining different data sources for data quality related information (1120).

The metadata analytics circuitry 728 may identify the key data frames among the transactions for each data source to establish a timeline data flow (1122). It is then determined if all the schemas received from the different data sources are properly identified to allow normalization of the metadata (1126). If not, the metadata analytics circuitry 728 may choose a different mapper (1128) and return to matching the different mapper the schema identified as not being properly identified (1112).

Figure 12:
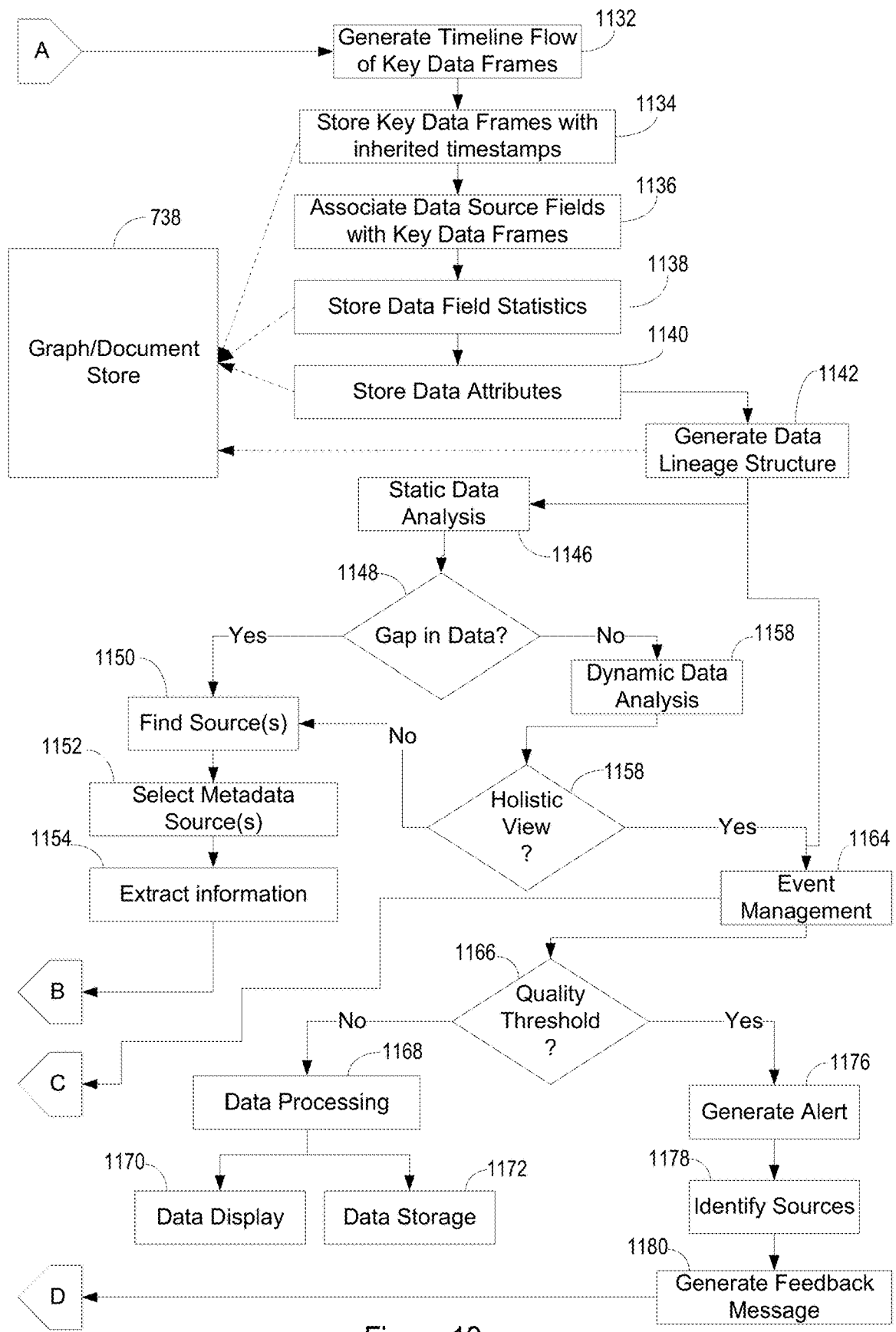
FIG. 12 is second part of the operational flow diagram of FIG. 11 illustrating example operation of the architecture.

Referring now to FIG. 12, if all the schemas are properly identified the metadata analytics circuitry 728 may generate a timeline flow of the key data frames (1132). The key data frames may be stored in the graph store and the document store with time stamps (1134). The data source fields may be associated with the key data frames (1136) by the metadata analytics circuitry 728. Data field statistics may be stored in the graph store and document store (1138). Data attributes may also be stored in the graph store and the document store (1140). The metadata analytics circuitry 728 may generate the data lineage structure using the graph store and the document store (1142). The metadata analytics circuitry 728 may leverage the descriptive module 730 and the predictive module 732 to perform static data analysis (1146) of the normalized metadata across the different data sources, such as lineage data structure analysis and scoring. Based on the static analysis, the metadata analytics circuitry 728 may identify gaps in the normalized meta data (1148). If there are gaps in the metadata, the metadata analytics circuitry 728 may locate a data source(s) that can fill the gap (1150). The metadata analytics circuitry 728 may select the metadata source(s) (1152). Metadata information may be extracted from the selected metadata data source(s) (1154) and the operation may return to add the selected metadata sources to the catalog (1110).

If no gaps in the data are identified, the metadata analytics circuitry 728 may perform dynamic data analysis (1158), such as determining data quality metrics, identifying data quality, and performing data quality scoring. The metadata analytics circuitry 728 may determine if a holistic view of the incidence schema is present (1160). If not, the metadata analytics circuitry 728 may find source(s) (1150) select metadata source(s) (1152), extract information (1154), etc. If the holistic view is present, the event manager 736 may apply predetermined rules and logic that may be triggered on events, conditions, or happenings (1164). The event manager 736 may monitor for a quality threshold (1166). If a quality threshold has not been crossed, processing by the data processing circuitry 708 may be performed, data may be displayed (1170), and data may be stored in the graph store 740 and the document store 742 as appropriate (1172).

If a quality threshold has been breached, the event manager 736 may generate an alert (1176), such as a data quality alert or a data lineage alert. The event manager 736 may identify one or more of the data sources that caused the quality threshold crossing (1178) The event manager may generate a feedback message (1180) and transmit the feedback message to the identified one or more data sources (1182). The operation may then return to mapping the transaction sources (1112).

The architecture 110 may perform computer based selection of data sources of interest from a myriad of workflows that might be of interest. Data is ingested from each of the data source(s) that align with a workflow. The ingested data may be normalized and stored in a universal metadata repository. If there is data missing (e.g. gaps) in the normalized information, selection of additional data may be performed. In addition, the architecture may prepare and enrich the normalized data. For example, data may be transformed, normalized, and selectively enriched. Data transformation, normalization and enrichment may be based on rules, machine learning, logic, artificial intelligence, modeling and other computer based analysis and functionality.

Analysis may be performed automatically, such as static analysis and dynamic analysis to automatically create unified data view(s). Static analysis may include lineage data structure generation, analysis and scoring, for example. Data lineage analysis may involve information surrounding what the composition of values can be performed. Data lineage data quality may also be analyzed and automatically enriched using, for example, artificial intelligence (AI) and/or machine learning (ML). Dynamic analysis may include data quality metric identification, generation and analysis. Data may be profiled and information regarding statistics, coverage, data quality rules may be determined automatically by the architecture using, for example, artificial intelligence (AI) and/or machine learning (ML).

The architecture may also provide living reports that may be generated for all aspects of the data represented in the universal metadata repository, including quality and lineage. The universal metadata repository may represent a central location that holds a holistic view that can be queried and automatically refreshes views, such as data quality and data lineage views. Within the universal metadata repository, AI/ML may be employed to resolve data conflicts and verify data integrity. The architecture may use the dynamic analysis to automatically repeat the process, resulting in measuring and grading on live data.

The methods, devices, architectures, processing, circuitry, circuitrys and logic described above may be implemented in many different ways and in many different combinations of hardware and software. For example, all or parts of the circuitrys and other implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. For instance, any of the components and functionality in the architecture 110 may be hosted in virtual machines managed by a cloud services provider. That is, while some implementations may be completely localized within a given enterprise, other implementations are completely migrated into the cloud, or are hybrid implementations with mixed local and cloud implementation.

What is claimed is:

1. A method comprising:
in a network connected hardware system:
identifying a pre-defined workflow for analysis;
selecting data sources that provide input data to the pre-defined workflow;
with communication circuitry:
retrieving source metadata from the data sources that characterizes the input data provided to the pre-defined workflow;
providing the source metadata to repository processing circuitry; and
with the repository processing circuitry:
integrating the source metadata into a universal metadata repository by reconciling disparate formats of the source metadata into a common schema format; identifying key data frames, wherein the key data frames are a sample of only part of the source metadata, and storing only the key data frames, as a representation of a larger body of the source metadata, in the universal metadata repository instead of the source metadata retrieved from the data sources, the key data frames including attributes providing a data source of the source metadata represented by the key data frames;
performing data analytics on the input data driven by the universal metadata repository by determining data quality metrics and data lineage analysis, wherein the key data frames are identified by analysis of the data quality metrics and data lineage analysis;
building and maintaining a data lineage structure for the input data according to the key data frames;
generating an incidence graph schema to model relationships within the source metadata using the key data frames, the key data frames depicted in the incidence graph schema; and
executing a feedback loop responsive to the data analytics to deliver a input data feedback message to at least one of the data sources, wherein the input data feedback message specifies a data quality alert responsive to the data quality metrics, the data quality alert being responsive to a data quality rule executed on the data quality metrics.

2. The method of claim 1, where:
performing data analytics comprises performing static data analysis to update the data lineage structure for the input data.

3. The method of claim 2, where:
the incidence graph schema comprises a technical context graph and a business context graph as two separate and independent graphs that each include relation information and a reference from one of the technical context graph or the business context graph to the other of the technical context graph or the business context graph.

4. The method of claim 3, where:
at least one of the technical context graph or the business context graph comprises a lineage data field specifying:
who affected the input data;
what affected the input data;
where the input data was affected;
when the input data was affected;
why the input data was affected;
how the input data was affected,
or any combination thereof.

5. The method of claim 3, where:
the input data feedback message specifies a data lineage alert responsive to the data lineage structure.

6. The method of claim 5, where:
the data lineage alert is responsive to a data lineage rule executed on the at least one of the technical context graph or the business context graph.

7. The method of claim 1, further comprising updating the key data frames by time, event, or change to the source metadata represented by the key data frames.

8. The method of claim 1, further comprising, generating, by metadata analytics circuitry, data source fields for each respective key data frame, each of the data source fields including the data quality metrics and the data lineage structure and providing a profile for a respective one of the data sources.

9. The method of claim 1, wherein each of the key data frames is associated with a respective data profile, and the respective data profile is indicative of when the source metadata was retrieved from the data sources.

10. A closed-loop unified metadata processing system comprising:
a processor;
universal metadata circuitry executable by the processor to retrieve source metadata from each of a plurality of different selected data sources that provide input data to a pre-defined workflow identified for analysis, the source metadata characterizing the input data;
metadata ingestion circuitry executable by the processor to normalize the source metadata into a universal metadata repository by reconciliation of disparate formats of the source metadata into a common schema format;
metadata analytics circuitry executable by the processor to perform data analytics on the input data driven by the universal metadata repository, performance of the data analytics comprising:
data quality metrics analysis and data lineage analysis of the source metadata;
identification of key data frames based on the data quality metrics analysis and the data lineage analysis, the key data frames being a sample of larger amounts of metadata included in the source metadata;
storage of the key data frames, in the common schema format, instead of the source metadata, in the universal metadata repository, the key data frames including attributes providing a data source of the source metadata represented by the key data frames;
generation of an incidence graph schema to model a relational composition of metadata represented by the key data frames, the key data frames depicted in the incidence graph schema; and
event manager circuitry executable by the processor to execute a feedback loop responsive to the data analytics to deliver a input data feedback message to at least one of the data sources, wherein the input data feedback message specifies a data quality alert responsive to the data quality metrics, the data quality alert being responsive to a data quality rule executed on the data quality metrics.

11. The system of claim 10, where:
each of the data sources provides a dataset of the source metadata, and each of the key data frames being stored in the universal metadata repository to represent the dataset of respective data sources.

12. The system of claim 11, where:
the metadata analytics circuitry is further executable by the processor generate a time line flow of metadata represented with the key data frames.

13. The system of claim 10, where:
the universal metadata repository comprises a graph store and a document store.

14. The system of claim 10, where:
the input data feedback message comprises one of a data quality message or a data lineage message indicative of a gap or missing part of the source metadata among the key data frames, the data quality message or the data lineage message generated based on acceptance testing to update or enrich the source metadata and corresponding key data frame.

15. The system of claim 10, further comprising a metadata schema enforcement circuitry executable by the processor to identify a mapper tool to extract metadata from a data source, the mapper tool configured to map the metadata to a universal schema of the universal metadata repository.

16. The system of claim 10, where the incidence graph schema comprises a graph representing a shared consolidated view of metadata across disparate data sources, data types, data stores, and application uses of the input data.

17. A non-transitory computer readable medium comprising instructions executable by a processor, the instructions comprising:
instructions executable by the processor to select a plurality of data sources that provide input data to an identified pre-defined workflow;
instructions executable by the processor to ingest a dataset of metadata from each of the data sources, the dataset of metadata characterizing the input data provided to the pre-defined workflow;
instructions executable by the processor to normalize the ingested dataset of metadata to a uniform schema by reconciliation of disparate formats of the source metadata into a common schema format of a universal metadata repository;
instructions executable by the processor to perform data quality analysis and data lineage analysis;
instructions executable by the processor to identify a key data frame in each of the ingested datasets of metadata based on the data quality analysis and the data lineage analysis;
instructions executable by the processor to store only the key data frame, in the common schema format, in the universal metadata repository in association with a timestamp indicating when a respective dataset of metadata was ingested and attributes providing a data source of the ingested dataset of metadata represented by the key data frame, each key data frame being identified due to being a representative sample of remaining metadata in the respective ingested dataset of metadata, the remaining metadata in the respective ingested dataset of metadata omitted from storage in the universal metadata repository;
instructions executable by the processor to generate an incidence graph schema modeling a relational composition of metadata represented by the key data frames, the incidence graph schema comprising a technical context graph and a business context graph generated based on the universal metadata repository and including a depiction of the key data frames;
instructions executable by the processor to generate a feedback message for transmission to one of the plurality of data sources, the feedback message comprising a data quality alert responsive to data quality metrics, the data quality alert being responsive to a data quality rule executed on the data quality metrics.

18. The non-transitory computer readable medium of claim 17, further comprising instructions executable with the processor to store the incidence graph schema in a graph store, and store the key data frames in a data store.

19. The non-transitory computer readable medium of claim 17, wherein the instructions executable by the processor to generate the incidence graph schema comprise instructions executable by the processor to generate an indication that elements of one of the technical context graph or the business context graph is used in elements of the other of the technical context graph or the business context graph.

20. The non-transitory computer readable medium of claim 17, further comprising instructions executable by the processor generate a time line flow of metadata represented with the key data frames.

* * * * *

UNITED STATES PATENT AND TRADEMARK OFFICE
CERTIFICATE OF CORRECTION

PATENT NO. : 11,379,537 B2
APPLICATION NO. : 15/801787
DATED : July 5, 2022
INVENTOR(S) : Jean-Luc Chatelain et al.

It is certified that error appears in the above-identified patent and that said Letters Patent is hereby corrected as shown below:

In the Claims

In Column 22, Line 20, add --and-- after frames; and before instructions

Signed and Sealed this
Fourth Day of October, 2022

Katherine Kelly Vidal
*Director of the United States Patent and Trademark Office*